United States Patent [19]

Beckey

[11] Patent Number: 4,703,795

[45] Date of Patent: Nov. 3, 1987

[54] CONTROL SYSTEM TO DELAY THE OPERATION OF A REFRIGERATION HEAT PUMP APPARATUS AFTER THE OPERATION OF A FURNACE IS TERMINATED

[75] Inventor: Thomas J. Beckey, Edina, Minn.

[73] Assignee: Honeywell Inc., Minneapolis, Minn.

[21] Appl. No.: 642,601

[22] Filed: Aug. 20, 1984

[51] Int. Cl.$^4$ .............................................. F25B 29/00
[52] U.S. Cl. .................................... 165/29; 236/1 EA; 236/68 B
[58] Field of Search ............... 236/68 B, 1 ER, 1 EA; 165/27, 26, 29

[56] References Cited

U.S. PATENT DOCUMENTS

| | | | |
|---|---|---|---|
| 2,295,349 | 9/1942 | Feine . | |
| 2,978,228 | 4/1961 | Carlson | 165/27 |
| 3,093,866 | 6/1963 | Liebrecht . | |
| 3,191,399 | 6/1965 | Stewart . | |
| 3,993,121 | 11/1976 | Medlin et al. . | |
| 3,996,998 | 12/1976 | Garst . | |
| 4,102,390 | 7/1978 | Harnish et al. . | |
| 4,158,383 | 6/1979 | Rayfield . | |
| 4,231,352 | 11/1980 | Bowden | 165/29 |
| 4,270,597 | 6/1981 | Denny | 236/1 EA |
| 4,298,056 | 11/1981 | Nelson . | |
| 4,346,755 | 8/1982 | Alley et al. . | |
| 4,388,791 | 7/1982 | Stamp, Jr. . | |
| 4,427,055 | 1/1984 | Heavener . | |
| 4,445,567 | 5/1984 | Nelson | 165/29 |

FOREIGN PATENT DOCUMENTS 0007497 2/1980 European Pat. Off. ............ 165/29

OTHER PUBLICATIONS

Honeywell brochure, Form No. 60-2485-1-Multistage Thermostat and Subbase, Rev. 4-81.

Primary Examiner—William R. Cline
Assistant Examiner—John K. Ford
Attorney, Agent, or Firm—Clyde C. Blinn

[57] ABSTRACT

A multistage space thermostat control system for controlling a refrigeration heat pump and a furnace controls the heat pump from a first stage of a space thermostat and a furnace from a second stage with anticipation circuit means associated with said thermostat control system which is changed in effectiveness depending upon the operation to reduce temperature swings in the space.

5 Claims, 2 Drawing Figures

CONTROL SYSTEM TO DELAY THE OPERATION OF A REFRIGERATION HEAT PUMP APPARATUS AFTER THE OPERATION OF A FURNACE IS TERMINATED

BACKGROUND AND SUMMARY OF THE INVENTION

For many years refrigeration apparatus has been used for both heating and cooling of a space such as in a home. The apparatus is commonly known as refrigeration "heat pump" apparatus. With the use of a heat pump, the advantages diminish as the outdoor temperature drops; in fact, at low outdoor temperatures the capacity of the heat pump may not be sufficient to maintain the space temperature required in the house. The use of auxiliary heating apparatus such as electric strip heaters is quite common; however, with the increase in the cost of electrical energy, other auxiliary heating sources may be desired, such as a gas furnace.

When a gas furnace is used as an auxiliary heating source and is located upstream of the heat pump, care must be taken to ensure that the refrigeration heat pump is not operated when the furnace has a high temperature output. Some prior art systems of the type disclosed in the M. G. Garst, et al, U.S. Pat. No. 3,996,998, issued Dec. 14, 1976, make use of time delay devices or temperature responsive devices which are used to prevent the operation of the heat pump when the plenum temperature of the furnace is above a predetermined temperature. Thus, when the furnace is on, the heat pump is off and, after the operation of the furnace is terminated, either a time delay is imposed on the system before the heat pump can be operated, or a temperature responsive device is used to prevent the heat pump from operating until the plenum temperature is reduced. Both of these prior art concepts add cost to a control system.

Another prior art control system has a multistage space thermostat for controlling a heat pump and an auxiliary heating source or furnace for interposing a time delay in the operation of the heat pump after the furnace has operated. The delay is accomplished by transferring the operation of the auxiliary heating furnace to the first stage of the space thermostat and not allowing the heat pump to be energized until the first stage is satisfied. The heat pump is delayed in its operation until the space temperature increases through the first stage differential temperature. This delay is sufficient time for the temperature of the furnace to be reduced to an acceptable operating temperature for the heat pump.

In such a control system large temperature swings of the space are common along with overshoot of the temperature setting of the first stage, both adding to discomfort.

The present invention is concerned with an improvement to a control system having a two stage thermostat with anticipation for each stage whereby when the second stage calls for heat by the furnace, the heat pump is deenergized and the furnace is connected to the first stage. To lessen temperature swings and overshoot of the space temperature, the anticipation of both stages are controlled by the first stage to increase the anticipation to the thermostat.

DESCRIPTION OF THE INVENTION

Figure 1:
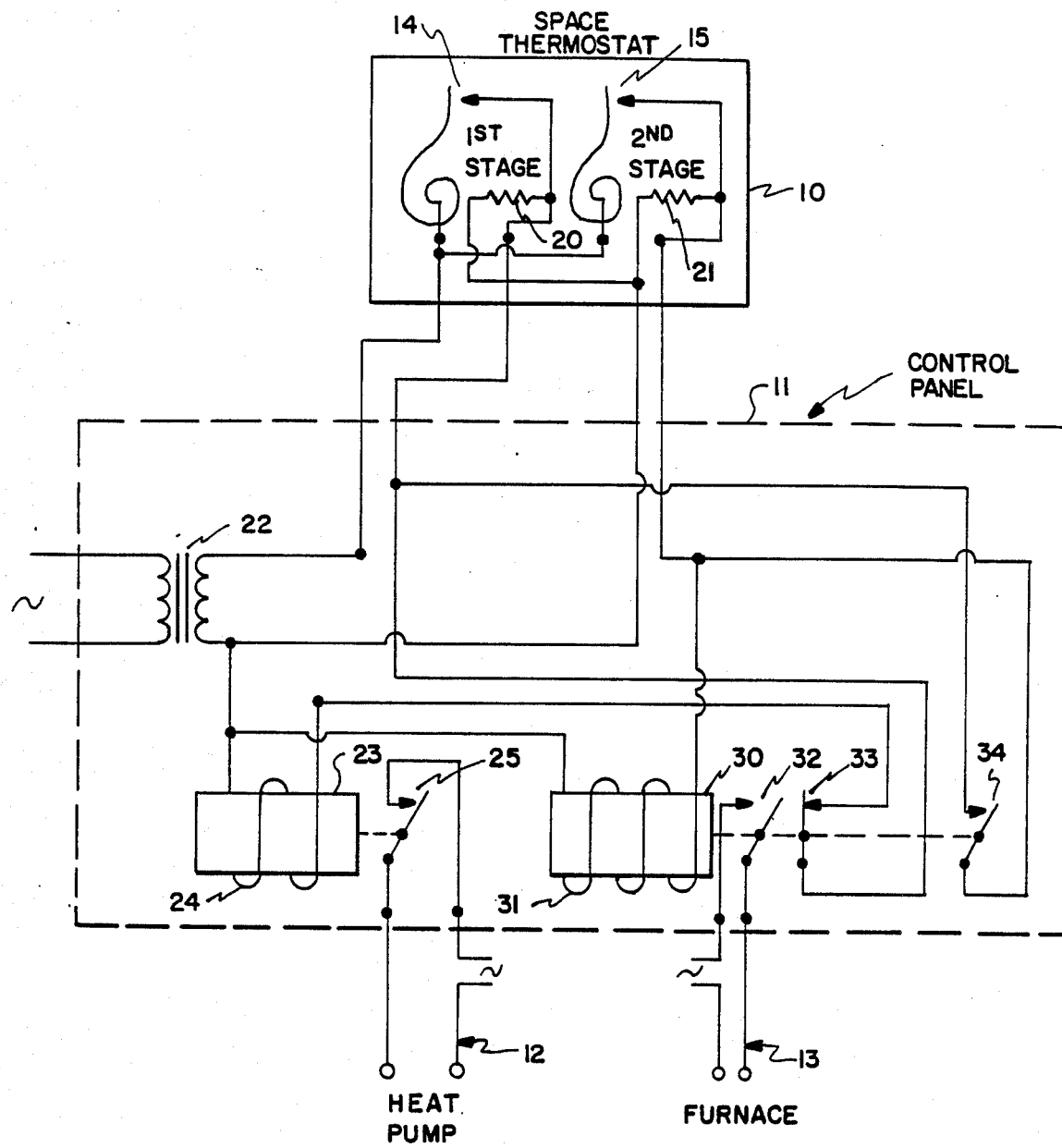
FIG. 1 is a schematic representation of the control system having a multistage thermostat for controlling a heat pump and a furnace with two means of anticipation.

Referring to FIG. 1, a control system has a conventional multistage temperature responsive means or thermostat 10 connected to a control panel 11 having a plurality of actuators. Thermostat 10 might be a T874 Multistage Thermostat manufactured by Honeywell Inc. Control panel 11 is adapted to be connected to a refrigeration heat pump apparatus at 12 and a high temperature auxiliary heating source or apparatus such as a gas furnace at 13. The heat pump apparatus might be of the type shown in U.S. Pat. No. 3,093,977, issued June 18, 1963, W. W. Liebrecht, inventor; and/or U.S. Pat. No. 4,298,056, issued Nov. 3, 1981, L. W. Nelson, inventor, wherein the auxiliary heat is electrical; however, in the present disclosure a conventional gas furnace is used for the auxiliary heat source.

Space thermostat 10 comprises a first temperature responsive switch means or first stage 14 and a second temperature responsive switch means or second stage 15. Each of the stages has an anticipation circuit means or heater 20 and 21, respectively, and the anticipation to the thermostat is variable. The anticipation circuit means operates in a conventional manner to anticipate the rise in space temperature and turn off the thermostat as set forth in the M. E. Feine U.S. Pat. No. 2,295,340, issued Sept. 8, 1942. Space thermostat 10 might be set to close the first stage 14 at some temperature such as 72° Fahrenheit (22° Celsius) and the second stage 15 at 68° F. (20° C.), and the respective stages would open upon a space temperature increasing through the switch differential which might be 1.5° F.

While the temperature responsive switch means are shown as bimetal operated switches, other types of electronic temperature responsive switch means and electronic anticipation circuits might be used as shown in the John T. Adams, et al, U.S. Pat. No. 4,401,262, issued Aug. 30, 1983, and used in a T8100A Microelectronic Thermostat manufactured and sold by Honeywell Inc.

Control panel 11 has a source of power 22 shown as a conventional step down transformer connected to a line voltage supply. A first actuator or relay 23 has an energization winding 24 and a normally open switch 25 adapted to be connected to control the operation of the heat pump. Another actuator or relay 30 has an energization winding 31 and three switches operated thereby. A normally open switch 32 is adapted to be connected to control the operation of the furnace. A normally closed switch 33 is connected to open the normal energization circuit of actuator 23 when actuator 30 is operated. A normally open switch 34 is connected to heat anticipation heaters 20 and 21 of the space thermostat 10 to connect the heaters together when operation is transferred to first stage 14 of the thermostat.

OPERATION OF THE INVENTION

As shown in FIG. 1, space thermostat 10 is satisfied and both stages or temperature responsive switches 14 and 15 are open. Upon a drop in the space temperature to close switch 14, actuator 23 is operated and the heat pump is energized to deliver heat to the space in which thermostat 10 is located. During outdoor load conditions when the space temperature can be satisfied by the capacity of the heat pump, first stage 14 will cycle on and off in a conventional manner effected by the heat output of heat anticipation heater 20. Heater 20 is connected directly across a secondary winding of transformer 22 when switch 14 is closed, such as during the operations shown by 41 in FIG. 2. The heater is not energized at 40 and 37. A predetermined cycling rate will be established by the design and size of the components of thermostat 10.

Figure 2:
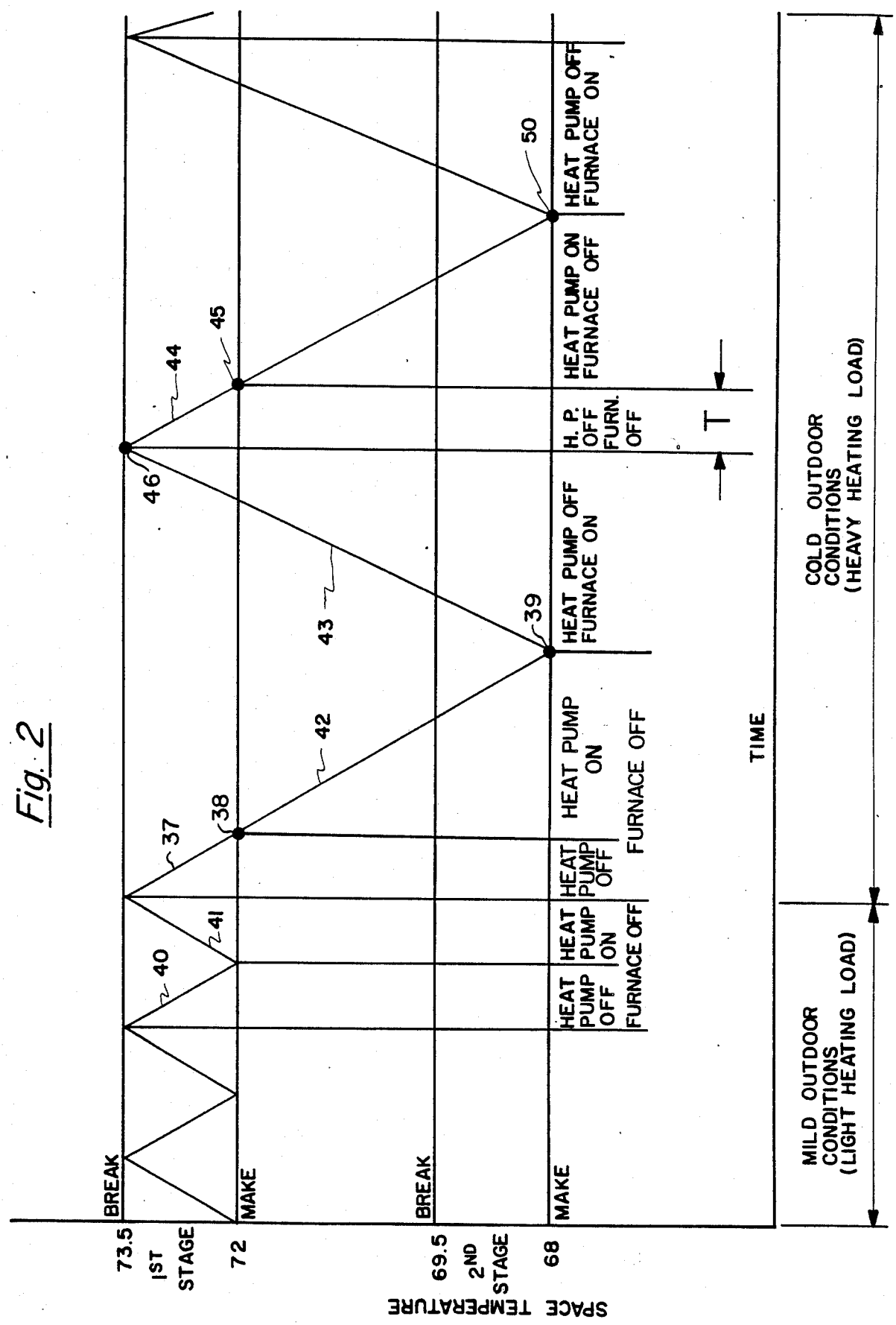
FIG. 2 is a graphical representation of the operation of the multistage thermostat system.

Upon a decrease in the space temperature due to cold outdoor conditions or larger heating load as shown by 42 in FIG. 2, which cannot be satisfied by the heat pump which is turned on at 38, the second stage 15 of the thermostat will close to energize actuator 30. Upon the energization of actuator 30, the heat pump is deenergized and the furnace is brought into operation. Specifically, when switch 33 opens, the energization circuit from first stage 14 of the thermostat to actuator 23 is opened and the heat pump is deenergized. This operation is to prevent the high temperature of the furnace operation from adversely affecting the heat pump. At the same time, switch 34 closes to connect actuator 30 to first stage 14 of the space thermostat. Also heat anticipation means or heater 21 is connected directly across the secondary winding of transformer 22 when switch 15 is closed, in parallel with heater 20 so that both heaters provide the anticipation heat confined to thermostat 10 to effect the operation of stage 14.

Referring to FIG. 2, a graphical representation of the operation of the control system is shown. The space temperature is plotted for mild outdoor conditions (light heating load) and cold outdoor conditions (heavy heating load). In the design of thermostats, the switch differential of the thermostat and the capacity of the heating source determine the amount of heat anticipation or size and effectiveness of the heater which is used to artificially heat the bimetal of the thermostat. The first stage of the thermostat is shown with the make and break temperatures for the switch of 72° and 73.5° and as the thermostat cycles between the make and break temperatures, the heat pump is cycled off and on and no furnace operation is provided. With the switch differential of 1.5° and the low capacity heat source or heat pump, a given value of heat is needed from the anticipation heater 20 of the first stage as shown in FIG. 1 to provide the correct cycling rate and maintain the swings in temperature within certain predetermined limits as shown in FIG. 2 by lines 40 and 41.

As the outdoor conditions change and a heavy heating load is experienced, the space temperature drops along line 37 until at 38 the first stage turns the heat pump on and continues to drop along line 42. When the space temperature reaches the make temperature at 39 for stage 2, the heat pump is turned off and the furnace is turned on. Rather than operating the furnace through the differential of the second stage between the make and break temperatures of 68° and 69.5° F., the furnace is now operated over a 5.5° switch differential as the furnace is turned on at 39, the make temperature of the second stage, and turned off at 46 the break temperature of the first stage. If the heavy load conditions take place, the swings in temperature would be as shown in line 43 to increase to the break temperature and line 44 until the make temperature of 50 was again reached. After the furnace is turned off at 46, upon reaching the break temperature of the first stage, and the space temperature drops along the line 44. The time required to reach the make temperature of the first stage at 45 is the time that the heat pump is maintained off after the furnace is turned off. This time T gives the furnace sufficient time to cool down before the heat pump is operated.

With the larger switch differential for the furnace operation between the make temperature 68° at 39 and the break temperature of 73.5° at 46, and the larger capacity of the furnace, more anticipation is needed in the thermostat to eliminate large temperature swings of the space temperature. With the energiziation of both heaters 20 and 21 as shown in FIG. 1, when the furnace is in operation, during the operation shown by 43 in FIG. 2, by both heaters 20 and 21 operating, the additional or increased capacity of anticipation to the thermostat temperature responsive means is provided for a more stable operation. Less temperature swings of the space temperature are experienced as the thermostat cycles between the make temperature of the second stage and the break temperature of the first stage when operating the furnace, By the time delay T shown in FIG. 2, by switching the operation of the furnace over to the first stage of the thermostat this system accomplishes the desirable operation to prevent the heat pump from operating until after a certain time period T after the furnace has been turned off. With the connection of heaters 20 and 21 for the increased capacity of anticipation to the thermostat when the furnace is being operated through the wide switch differential, the room temperature swings and temperature overshoot are reduced to a more acceptable level.

The embodiments of the invention in which an exclusive property or right is claimed are defined as follows:

1. An improvement in a control system having a multistage space thermostat for controlling the operation of a refrigeration heat pump and a furnace, furnishing heated air through a common duct to a space, to prevent operation of the heat pump after operation of the furnace until sufficiently low air temperature from the furnace exists wherein upon a drop in the space temperature below a first predetermined temperature a first stage of said thermostat energizes the heat pump and upon a further drop in space temperature below a second predetermined temperature a second stage of said thermostat energizes the furnace, the thermostat having anticipation circuit means, the improvement comprising, means actuated upon energization of said furnace by said second stage when a make temperature is reached for disconnecting said heat pump from said first stage thermostat, further means actuated by said second stage for energizing said furnace by said first stage until a break temperature is reached whereby said furnace remains energized until said first stage is satisfied, and means for increasing the output of the anticipation circuit means controlled by said first stage to reduce said break temperature of said first stage during the period between when said second stage turns on said furnace and said first stage turns off said furnace to reduce swings in space temperature due to a larger differential in the thermostat operation.

2. In a control system for a refrigeration heat pump and an auxiliary heat high temperature source wherein heated medium is supplied to a space by a common means and it is desired not to operate the heat pump until the temperature of the medium by the high temperature source is reduced to predetermined level, two stage space thermostat means, a first of said two stages calling for heat at a first predetermined space temperature and a second of said two stages calling for heat at a second lower predetermined space temperature, first actuator means adapted to control the operation of the heat pump, first circuit means connecting said first stage of said two stage thermostat to said first actuator means to effect operation of the heat pump upon a call for heating by said first stage when the space temperature drops below said first predetermined temperature, second actuator means adapted to control the operation of the high temperature source, second circuit means connecting said second stage of said two stage thermostat to said second actuator means to effect operation of the high temperature source upon a call for heating by said second stage when the space temperature drops below said second predetermined temperature, anticipation circuit means connected to said thermostat means, said anticipation circuit means having a variable anticipation, first means associated with said second actuator means when energized for opening said first circuit means to deenergize said first actuator means and the heat pump, second means associated with said second actuator means when energized for connecting said second actuator means to said first stage to maintain the high temperature source operating until said first stage is satisfied, and third means associated with said second actuator means connected to said anticipation circuit means to increase its anticipation effect on said first stage when said high temperature heat source is operated to reduce swings in the space temperature due to the larger differential between the turning on of the high temperature source and the turning off of the high temperature source.

3. The invention of claim 2, wherein said two stage space thermostat means has a first temperature responsive switch means for controlling said first actuator means and a second temperature responsive switch means for controlling said second actuator means, and said anticipation circuit means comprises a first anticipation heater associated with and controlled by said first temperature responsive switch means and a second anticipation heater associated with and controlled by said second temperature responsive switch means, and circuit means associated with said second actuator means when energizing the high temperature source for connecting said second anticipation heater to also be controlled by said first temperature responsive switch means to increase the amount of heat to said first temperature responsive switch means while it is maintaining the energization of the high temperature source.

4. The invention of claim 2 wherein, said first stage of said thermostat has a temperature responsive switch means operating with a predetermined temperature differential between a closed and open circuit condition, said second stage of said thermostat has a temperature responsive switch means operating with a predetermined temperature differential between a closed and open circuit condition, and said second circuit means increasing the capacity of said anticipation means when the high temperature heating apparatus is operating between the closed position of stage two and the open position of stage one.

5. In a control system for a refrigeration heating apparatus and a high temperature heating apparatus wherein simultaneous operation of said apparatuses is not desired as the high temperature heating apparatus adversely affects the refrigeration heating apparatus and a delay in the operation of said refrigeration apparatus is desired after the high temperature apparatus operation is terminated, comprising:

two stage space thermostat means having a first stage adapted to operate the refrigeration heating apparatus and a second stage adapted to operate the high temperature heating apparatus, first anticipation circuit means connected to said first stage of said thermostat means to be operated when said first stage calls for heat, second anticipation circuit means connected to said second stage of said thermostat means to be operated when said second stage calls for heat, circuit means connected to said second stage when operating said high temperature heating apparatus for rendering said refrigeration heating apparatus inoperative, and second circuit means connected to said second stage for connecting said high temperature heating apparatus to said first stage and connecting said first and second anticipation circuit means to said first stage to be operated together to affect the operation of said first stage when said first stage calls for heat to reduce space temperature swings in the space.

* * * * *